(12) United States Patent
Koss

(10) Patent No.: US 8,080,232 B2
(45) Date of Patent: Dec. 20, 2011

(54) PROCESS FOR RECOVERING CARBON DIOXIDE

(75) Inventor: Ulrich Koss, Zollikon (CH)

(73) Assignee: Lurgi GmbH, Frankfurt A m Main (DE)

(*) Notice: Subject to any disclaimer, the term of this patent is extended or adjusted under 35 U.S.C. 154(b) by 75 days.

(21) Appl. No.: 12/514,978

(22) PCT Filed: Oct. 31, 2007

(86) PCT No.: PCT/EP2007/009442
§ 371 (c)(1),
(2), (4) Date: Nov. 10, 2009

(87) PCT Pub. No.: WO2008/058636
PCT Pub. Date: May 22, 2008

(65) Prior Publication Data
US 2010/0074829 A1 Mar. 25, 2010

(30) Foreign Application Priority Data
Nov. 18, 2006 (DE) .................. 10 2006 054 472

(51) Int. Cl.
*C01B 3/24* (2006.01)
*C01B 3/38* (2006.01)
(52) U.S. Cl. ................................. 423/650; 252/373
(58) Field of Classification Search .................. 423/650
See application file for complete search history.

(56) References Cited

U.S. PATENT DOCUMENTS

| 4,609,043 | A | 9/1986 | Cullick |
| 4,863,707 | A | 9/1989 | McShea, III |
| 6,899,859 | B1 | 5/2005 | Olsvik |
| 2003/0181314 | A1 | 9/2003 | Kranz |
| 2004/0028595 | A1* | 2/2004 | Davey et al. .................. 423/361 |
| 2005/0271581 | A1* | 12/2005 | Meyer et al. ............... 423/658.2 |

FOREIGN PATENT DOCUMENTS

| DE | 3132755 A1 | 4/1983 |
| EP | 1337466 A | 8/2003 |

OTHER PUBLICATIONS

English Language Abstract for EP 1337466, 2003.

* cited by examiner

*Primary Examiner* — Melvin Mayes
*Assistant Examiner* — Kenneth Vaden
(74) *Attorney, Agent, or Firm* — Norris McLaughlin & Marcus PA

(57) ABSTRACT

In a process for obtaining $CO_2$, desulfurized natural gas or gas which accompanies mineral oil is reformed autothermally with addition of oxygenous gas at a temperature of from 900 to 1200° C. and a pressure of from 40 to 100 bar (a) by partial catalytic oxidation to give a crude synthesis gas, and then converted catalytically to H2 and $CO_2$ at a temperature of from 75 to 110 DEG C. and a pressure of from 50 to 75 bar (a) of CO, $CO_2$ is scrubbed out of the synthesis gas obtained with methanol at a pressure of from 15 to 100 bar (a) and a temperature of from +10 to −80° C., and the absorbed $CO_2$ is recovered by decompression. A further possible use of the process consists in converting the recovered $CO_2$ to the supercritical state.

5 Claims, 1 Drawing Sheet

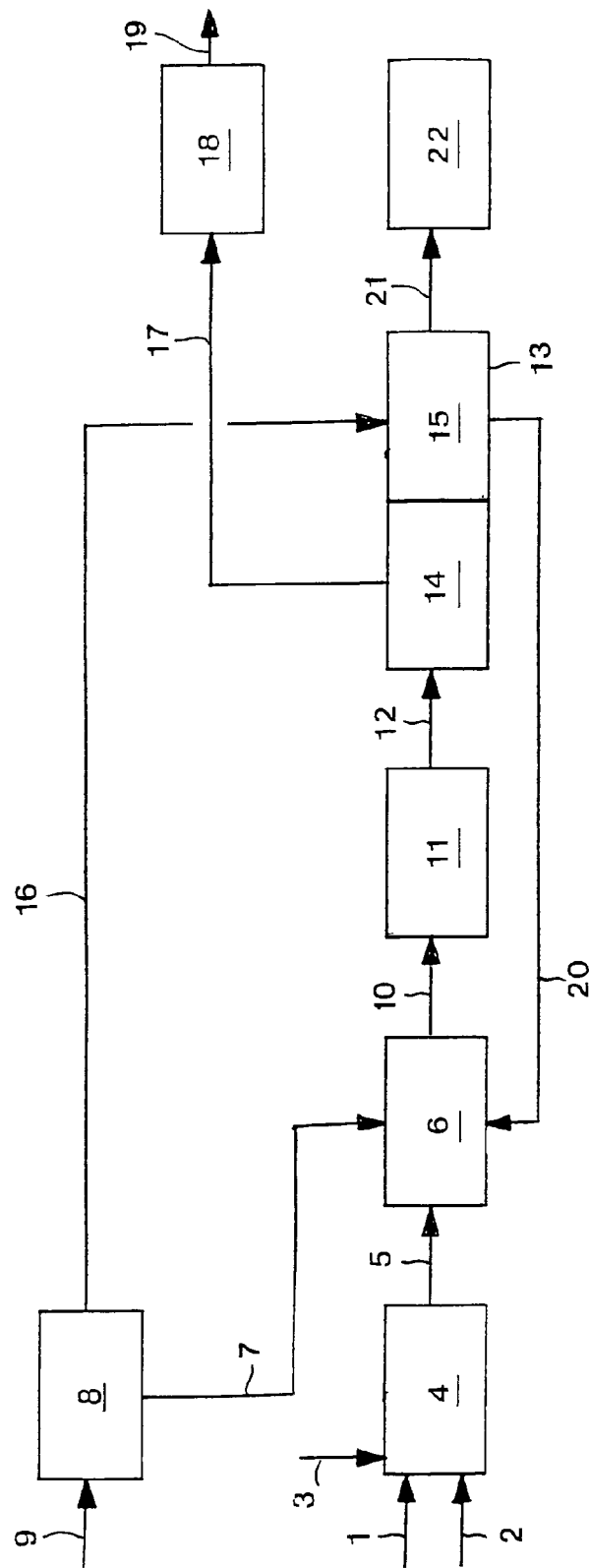
FIGURE

PROCESS FOR RECOVERING CARBON DIOXIDE

This application is a 371 application of PCT/EP2007/009442 filed Oct. 31, 2007, which claims priority to the German application DE 10 2006 054 472.2 filed Nov. 18, 2006.

This invention relates to a process for recovering $CO_2$ from desulfurized natural gas or petroleum gas liberated from $C_{2+}$ components, which, preheated to a temperature of 45 to 75° C., is autothermally reformed in a first reaction stage by adding gas containing at least [calculated dry] 75 vol-% $O_2$ at a temperature of 900 to 1200° C. and a pressure of 40 to 100 $bar_{abs}$ by partial oxidation over a fixed bed of a cracking catalyst to obtain a raw synthesis gas, containing as main components [calculated dry] 55 to 75 vol-% $H_2$, 15 to 30 vol-% CO and 5 to 30 vol-% $CO_2$ with a volume ratio of $H_2$:CO of 1.6 to 4, in a second reaction stage the CO contained in the raw synthesis gas having a temperature of 75 to 110° C. and a pressure of 50 to 75 $bar_{abs}$ is converted to $H_2$ and $CO_2$ over at least one fixed-bed catalyst, from the synthesis gas containing at least [calculated dry] 55 vol-% $H_2$ $CO_2$ is washed out in at least one washing stage at a pressure of 15 to 100 $bar_{abs}$ with methanol having a temperature of +10 to –80° C., and absorbed $CO_2$ is recovered by expanding the cold methanol to almost atmospheric pressure.

From EP-B-1 337 466, there is known a process for catalytically generating $NH_3$ from an $N_2$—$H_2$ mixture. Natural gas together with a gas stream chiefly consisting of $O_2$, preferably at least 70 vol-%, is autothermally reformed at a temperature of 900 to 1200° C. and a pressure of 40 to 100 $bar_{abs}$ in the presence of a cracking catalyst to obtain raw synthesis gas, containing [calculated dry] 55 to 75 vol-% $H_2$, 15 to 30 vol-% CO and 5 to 30 vol-% $CO_2$ at a volume ratio of $H_2$:CO of 1.6 to 4. By catalytic conversion, the CO content of the cooled raw synthesis gas withdrawn from the autothermal reformer is converted to $H_2$, so that the synthesis gas formed contains at least [calculated dry] 50 vol-% $H_2$ and not more than 8 vol-% CO. In a multistage gas wash, $CO_2$, CO and $CH_4$ are removed from the synthesis gas, wherein in at least one of the stages liquid $N_2$ is added for generating an $N_2$—$H_2$ mixture for the catalytic production of ammonia in an ammonia synthesis. In the gas wash, $CO_2$ is removed with methanol having a temperature of –58° C. and in conjunction with the production of $NH_3$ is used for generating urea. In the $N_2$ wash, the synthesis gas is cooled to a temperature of –185° C., so that first $CH_4$ and then CO are condensed and both components are recirculated to the autothermal reformer as fuel gas.

It is the object of the present invention to utilize the process described above for further applications.

The solution of this object consists in that the $CO_2$ recovered is transferred into the critical condition, so that for solvent flooding the $CO_2$ is injected into partially deoiled petroleum deposits or can be stored in pore reservoirs, in cavern reservoirs, in depleted natural gas deposits suitable as reservoir or in saline aquifers or can be used for oxo synthesis.

In accordance with the further aspect of the process, it is possible to wholly or partly supply the $H_2$ recovered as fuel to a gas turbine or another means for generating electrical energy, for instance to a fuel cell, wherein in accordance with a further feature of the invention the $H_2$ can be diluted with up to 70 vol-% $N_2$.

In accordance with a particular feature of the invention, part of the mechanical energy generated by the gas turbine or another means for recovering electrical energy is utilized for driving the compressor of the air separation plant and/or the compression plant for the $CO_2$; the remaining part is available as useful energy.

The invention will subsequently be explained in detail with reference to an embodiment in conjunction with a basic flow diagram illustrated in the drawing.

Via conduit (1), natural gas is supplied to the pretreatment plant (4) with a pressure of 45 to 65 $bar_{abs}$ and a temperature of 15 to 35° C., via conduit (2) steam and via conduit (3) $CH_4$ is supplied to the pretreatment plant (4), in which the natural gas is liberated from sulfur compounds and $C_{2+}$ components on a bed of Co—Mo catalyst with a downstream bed of ZnO and preheated to a temperature of 55 to 75° C. The gas withdrawn from the pretreatment plant (4) via conduit (5) is charged to an autothermal reformer (6) along with high-oxygen gas supplied via conduit (7) with an $O_2$ content of [calculated dry] 92 vol-%, which is generated in an air separation plant (8) into which air is introduced via conduit (9). In the autothermal reformer (6) a bed of commercially available NiO catalyst is disposed, on which the natural gas is reformed by partial oxidation with $O_2$ to obtain raw synthesis gas containing CO, $H_2$ and $CO_2$ at a temperature of 900 to 1200° C. and a pressure of 40 to 100 $bar_{abs}$, preferably 40 to 80 $bar_{abs}$. The raw synthesis gas withdrawn from the autothermal reformer (6) via conduit (10) contains [calculated dry] 55 to 75 vol-% $H_2$, 15 to 30 vol-% CO and 5 to 30 vol-% $CO_2$ at a volume ratio of $H_2$:CO of 1.6 to 4. The raw synthesis gas cooled intermediately in a non-illustrated heat exchanger to a temperature of 25 to 45° C. is passed into a two-stage converter (11) filled with a bed of commercially available Fe—Cr catalyst, in which the CO still contained in the raw synthesis gas stream is converted to $CO_2$ and $H_2$, wherein the volume ratio of $H_2$:$CO_2$ [calculated dry] is 2.5 to 3. Upon traversing a non-illustrated heat exchanger, the synthesis gas stream obtained by conversion and withdrawn via conduit (12), which contains [calculated dry] at least 65 vol-% $H_2$ and not more than 8 vol-% CO, is introduced into a two-stage physical gas washing plant (13). In the first stage (14) of the gas washing plant (13), $CO_2$ is absorbed by means of methanol having a temperature of –20 to –70° C. at a pressure of 40 to 80 $bar_{abs}$. In the second stage (15) of the gas washing plant (13), the impurities CO, $CH_4$ and Ar left in the synthesis gas stream upon removal of $CO_2$ are absorbed by means of liquid nitrogen recovered in the air separation plant (8) and charged to the second stage (15) via conduit (16). For removing absorbed $CO_2$ from the methanol and the absorbed CO, $CH_4$ and Ar from the $N_2$, the methanol and the $N_2$ are expanded to almost atmospheric pressure. Via conduit (17), the $CO_2$ recovered is supplied to a plant (18) in which the $CO_2$ is brought into the supercritical condition by increasing pressure and temperature, and via conduit (19) it is injected into partly deoiled petroleum deposits for solvent flooding. The gas stream containing CO, $CH_4$ and Ar is recirculated to the autothermal reformer (6) as fuel gas via conduit (20). Via conduit (21), the $H_2$ obtained during the absorption of the $CO_2$ in the first stage (14) of the gas washing plant (13) flows as fuel into the combustion chamber of a gas turbine (22).

The data obtained with a concrete embodiment of the process of the invention for substance amounts, temperatures, pressures and composition of the gas streams are listed in the following table with reference to the basic flow diagram illustrated in the drawing.

| Conduit No. | 1 | 5 | 10 | 12 | 17 | 20 | 21 |
| --- | --- | --- | --- | --- | --- | --- | --- |
| Amount (t/h) | 92 | 263 | 336 | 400 | 0.044 | 0.01 | 49.8 |
| Temperature (° C.) | 25 | 65 | 95 | 32 | 40 | 40 | 209 |
| Pressure (bar$_{abs}$) | 55 | 61 | 60 | 57 | 110 | 58 | 30-54 |
| Composition Vol-% [calculated dry] | | | | | | | |
| $CH_4$ | 91.3 | 27.0 | 1.8 | 2.0 | — | 2.0 | 0.8 |
| $C_2H_6$ | 5.8 | — | — | — | — | — | — |
| CO | — | 1.6 | 10.6 | 1.1 | 0.1 | 1.1 | 1.9 |
| $CO_2$ | 1.9 | 0.6 | 7.1 | 16.7 | 99.6 | 16.7 | 0.5 |
| Ar | — | — | 0.3 | 0.5 | — | 0.5 | 0.9 |
| $H_2$ | — | 3.2 | 38.7 | 47.5 | 0.2 | 47.5 | 92.5 |
| $N_2$ | 1.0 | 0.3 | 0.4 | 2.3 | 0.1 | 2.3 | 4.2 |
| $H_2O$ | — | 67.3 | 41.1 | 29.9 | — | — | — |

For the gas wash (13), the known Rectisol® process is used, in which in the first stage (14) $CO_2$ is absorbed with methanol having a temperature of −58° C. In the second stage (15) of the gas wash (13), the temperature of the synthesis gas initially is decreased to a value of −185° C., so that the $CH_4$ is condensed, separated and recirculated into the autothermal reformer (3) as fuel gas together with the likewise separated CO and Ar.

The advantages achievable with the invention in particular consist in that emissions of $CO_2$ are prevented, in particular for ecological reasons, the process for recovering supercritical $CO_2$ can be used directly in situ for solvent flooding largely deoiled petroleum deposits in petroleum prospects, the petroleum gas obtained in the recovery of petroleum can be processed directly in situ in many petroleum prospects, and the gas components generated can be utilized within the process.

The invention claimed is:

1. A process for recovering $CO_2$ from desulfurized natural gas or petroleum gas liberated from $C_{2+}$ components, said process comprising preheating the natural gas or petroleum gas to a temperature of 45 to 75° C., autothermally reforming the natural gas or petroleum gas by partial oxidation in a first reaction stage by adding gas containing at least 75 vol-% $O_2$ at a temperature of 900 to 1200° C. and a pressure of 40 to 100 bar$_{abs}$ over a fixed bed of a cracking catalyst to obtain a raw synthesis gas, said raw synthesis gas comprising 55 to 75 vol-% $H_2$, 15 to 30 vol-% CO and 5 to 30 vol-% $CO_2$ with a volume ratio of $H_2$:CO of 1.6 to 4, converting the CO contained in the raw synthesis gas to $H_2$ and $CO_2$ over at least one fixed-bed catalyst in a second reaction stage, wherein the raw synthesis gas has a temperature of 75 to 110° C. and a pressure of 75 to 50 bar$_{abs}$, washing out the $CO_2$ from the synthesis gas in at least one washing stage at a pressure of 15 to 100 bar$_{abs}$ with methanol having a temperature of +10 to −80° C., and recovering absorbed $CO_2$ by expanding the cold methanol to almost atmospheric pressure, and recovering $H_2$, wherein CO, $CH_4$ and Ar are left in the synthesis gas upon removal of $CO_2$, wherein the $CO_2$ recovered is transferred into the supercritical condition and the CO, CH4 and Ar-containing gas is recirculated to the autothermal reformer as fuel gas, the supercritical $CO_2$ being used for solvent flooding of partially deoiled petroleum deposits, subterranean storage, or oxo synthesis.

2. The process according to claim 1, wherein the $H_2$ recovered is supplied as fuel to a gas turbine for generating electrical energy.

3. The process according to claim 2, wherein the $H_2$ recovered is diluted up to 70 vol-% $N_2$.

4. The process according to claim 2, wherein part of the mechanical energy generated by the gas turbine is utilized for driving the compressor of an air separation plant.

5. The process according to claim 2, wherein part of the mechanical energy generated by the gas turbine is utilized for driving the compressor for the CO2.

* * * * *